(12) United States Patent
Zasman (10) Patent No.: US 7,693,877 B1
(45) Date of Patent: Apr. 6, 2010

(54) AUTOMATED INFORMATION LIFECYCLE MANAGEMENT SYSTEM FOR NETWORK DATA STORAGE

(75) Inventor: Gary Ivor Zasman, Lafayette, CO (US)

(73) Assignee: Network Appliance, Inc., Sunnyvale, CA (US)

( * ) Notice: Subject to any disclaimer, the term of this patent is extended or adjusted under 35 U.S.C. 154(b) by 411 days.

(21) Appl. No.: 11/726,816

(22) Filed: Mar. 23, 2007

(51) Int. Cl.
*G06F 17/30* (2006.01)
*G06F 17/00* (2006.01)

(52) U.S. Cl. .................. 707/200; 707/9; 707/104.1; 711/161; 711/165; 726/26

(58) Field of Classification Search .................. None
See application file for complete search history.

(56) References Cited

U.S. PATENT DOCUMENTS

| | | | | |
|---|---|---|---|---|
| 5,325,505 | A * | 6/1994 | Hoffecker et al. | 707/101 |
| 7,346,751 | B2 * | 3/2008 | Prahlad et al. | 711/162 |
| 7,529,784 | B2 * | 5/2009 | Kavuri et al. | 707/204 |
| 2008/0016131 | A1 * | 1/2008 | Sandorfi et al. | 707/204 |

OTHER PUBLICATIONS

"Chapter 6: Business Continuity Management," from *Emergency Preparedness: Guidance on Part I of the Civil Contingencies Act 2004, its associated Regulations and non-statutory arrangements*, HM Government, Nov. 2005, pp. 74-92.
Silverthorn, Ann, "NetApp to OEM Kazeon ILM appliance," InfoStor, Oct. 12, 2005, downloaded from http://www.infostor.com/Articles/Article_Display.cfm?ARTICLE_ID=238847, Mar. 12, 2007, 3 pages.
Schwartz, Kevin D., "Kazeon Finds Niche by Classifying Unstructured Data," eWeek.com, Oct. 12, 2005, downloaded from http://www.eweek.com/article2/0,1895,1868275,00.asp, Mar. 12, 2007, 4 pages.
Fonseca, Brian, "Kazeon, Google Team on Storage Search," eWeek.com, Feb. 3, 2006, downloaded from http://www.eweek.com/article2/0,1895,1918817,00.asp, Mar. 12, 2007, 3 pages.
"DECRU DataFort Security Appliances," DECRU, a NetApp Company, 2007, downloaded from http://www.decru.com/products/datafort0.htm, Mar. 12, 2007, 3 pages.

* cited by examiner

*Primary Examiner*—Pierre M Vital
*Assistant Examiner*—Loan T Nguyen
(74) *Attorney, Agent, or Firm*—Blakely, Sokoloff, Taylor & Zafman LLP (57) ABSTRACT

An automated information lifecycle management (ILM) system for network storage automatically searches a network storage system to identify data items stored therein. The network storage system includes multiple data storage facilities of different types coupled to a network. The ILM system automatically classifies each of the data items into a category of multiple data categories, and automatically optimizes each of the data items to a particular data storage facility of the multiple data storage facilities, according to the category into which the data item was classified. The ILM system may also automatically discover and detect storage devices added to the network and assign them to the proper storage class, for storing data of the corresponding category. The ILM system further may automatically determine or predict when additional storage capacity is needed for any particular class of storage and may alert a user accordingly and/or free up additional storage capacity.

36 Claims, 9 Drawing Sheets

AUTOMATED INFORMATION LIFECYCLE MANAGEMENT SYSTEM FOR NETWORK DATA STORAGE

FIELD OF THE INVENTION

At least one embodiment of the present invention pertains to network storage systems and more particularly, to an automated information lifecycle management (ILM) system for network data storage.

BACKGROUND

Various forms of network storage systems exist today, including network attached storage (NAS), storage area networks (SANs), and others. Network storage systems are commonly used for a variety of purposes, such as backing up critical data, data mirroring, providing multiple users with access to shared data, etc.

A network storage system typically includes at least one storage server, which is a processing system configured to store and retrieve data on behalf of one or more client processing systems ("clients") that are used by users of the network storage system. In the context of NAS, a storage server is commonly a file server, which is sometimes called a "filer". A filer operates on behalf of one or more clients to store and manage shared files. The files are stored in a non-volatile mass storage subsystem (which is typically external to the storage server, but does not have to be) which may include one or more arrays of non-volatile mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with access to stored data at a sub-file level of granularity, such as block-level access, rather than file-level access. Some storage servers are capable of providing clients with both file-level access and block-level access, such as certain Filers made by Network Appliance, Inc. (NetApp®) of Sunnyvale, Calif.

One area which is gaining significant attention in relation to network storage technology is information lifecycle management (ILM). ILM can be defined as the practice of applying certain policies to the effective management of information throughout its useful life. ILM includes every phase of a "record" from its beginning to its end. A "record" in this context can be any kind of data or metadata stored in non-tangible form (e.g., electronically or optically stored data). ILM is based on the premise that the uses and usefulness of any given item of information are likely to change over time. ILM therefore involves dividing the lifecycle of information into various stages and creating an appropriate policy or policies to handle the information in each stage. ILM further involves providing the technology infrastructure to implement those policies, such as data storage technology. Operational aspects of ILM include data backup and protection; disaster recovery, restore, and restart; archiving and long-term retention; data replication; and day-to-day processes and procedures necessary to manage a storage architecture.

Three issues that ILM needs to address for the modern business enterprise are legal compliance, data security (privacy) and economics (cost). U.S. federal regulations and other forms of law mandate that certain types of information generated in the course of operating a business be retained, unmodified, for certain periods of time and be discoverable and available. Such records-retention regulations include, for example, Securities Exchange Commission (SEC) Rule 17a-4 (17 C.F.R. §240.17a-4(f)), which regulates broker-dealers; Health Insurance Portability and Accountability Act (HIPAA), which regulates companies in the healthcare industry; Sarbanes-Oxley (SOX), which regulates publicly traded companies; 21 C.F.R. Part 11, which regulates certain companies in the life sciences industry; and, DOD 5015.2-STD, which regulates certain government organizations; etc. Affected businesses therefore must adopt ILM policies, practices and technology infrastructure to comply with these laws.

As to data privacy, the prevalence of identity theft and electronic fraud in recent years as well as corporate piracy and trade secret theft make it critical for businesses to protect their customers' confidential data (e.g., social security numbers, birthdates, bank account numbers) and their own confidential data (e.g., intellectual property and other sensitive information).

These issues must be addressed in a cost effective manner, with respect to the cost of the technology infrastructure used to implement ILM and the need for information technology (IT) support staff to maintain that infrastructure and to train and assist employees in using it. Various technologies exists today to implement different aspects of ILM. For example, hierarchical storage management (HSM) has been used to provide multi-tiered storage architectures, which allow older data and infrequently-used data to be offloaded to relatively inexpensive (but slower) storage. Businesses often use some form of write-once/read-many (WORM) data storage facility to store data for legal compliance. Further, business sometimes encrypt sensitive data to address privacy concerns. However, no technology is known to date that provides a complete, beginning-to-end, cost-effective ILM solution for network data storage.

SUMMARY OF THE INVENTION

One aspect of the present invention is a method includes automatically searching a network storage system to identify data items stored therein, where the network storage system includes multiple data storage facilities of different types coupled to a network. The method further includes automatically classifying each of the data items into a category of multiple data categories, and automatically optimizing each of the data items to a particular data storage facility of the multiple data storage facilities, according to the category into which the data item was classified. Another aspect of the present invention is a system or apparatus that performs such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for automated ILM for network storage are described below. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The automated ILM system introduced here provides a complete, beginning-to-end, cost-effective ILM solution for network data storage. After initial system configuration, the ILM system can operate continuously with no user input or intervention, except when consumption of storage space may necessitate adding additional storage devices to the system. The system can operate on unstructured data (e.g., files), structured data (e.g., databases), semi-structured data (e.g., a e-mail), or any combination thereof. To simplify explanation, however, the following description assumes that the data managed by the ILM system is unstructured data.

As described further below, a network storage system in which the automated ILM system may be utilized includes multiple data storage facilities of different types or classes, coupled to a network. For example, the network storage system may include one or more storage servers, a set of high-performance Fibre Channel disk drives for use as primary storage (i.e., for critical or frequently used data), and nearline high-capacity SATA disk drives or similar and/or tape storage facility to provide secondary (archive) storage for older or infrequently used data. The automated ILM system periodically searches the network storage system to identify data stored therein (e.g., files). The ILM system uses metadata of the stored data and/or the actual content of the stored data to automatically categorize each data item into a category, such as: 1) highly active primary data (where "primary" data is defined as the working set of data), 2) other primary data, 3) data that must be preserved for purposes of legal compliance ("compliance data"), 3) confidential data, 4) archivable data, 5) dormant data, 6) duplicate data, 7) data that can be disposed of due to expiration of its retention period, 8) data that needs to be replicated, 9) database data that requires low-latency access, etc. The metadata that may be used for purposes of data categorization may include, for example, filename, file size, modification date, file ownership, and other file attributes. The actual content of the data may also be used to categorize the data, e.g., appearances of phrases such as "strictly confidential", credit card numbers, etc.

The ILM system automatically optimizes each categorized data item to the most appropriate data storage facility in the network storage system, according to the category into which the data item was classified. Optimizing to a storage facility, in this context, can include any one or more of the following operations: moving data to a particular storage facility, migrating data to a particular storage facility, deleting data in a particular storage facility, de-duplicating data in a particular storage facility, replicating data in a particular storage facility, etc. For example, compliance data can be sent to a designated WORM storage facility and retention periods set according to policies; confidential data can be encrypted and then stored in a secure storage facility designated exclusively for confidential data; archivable data (e.g., older or infrequently-used data) can be sent to less-expensive mass storage, such as nearline or tape storage. Data may be re-evaluated periodically or from time to time and, if appropriate, recategorized and moved or migrated to a class of storage facility that is more appropriate for its current categorization.

The ILM system may also automatically discover and detect storage devices when they are added to the network, determine the class of storage to which they belong, and allocate them for storing the category or categories of data which are best suited to that class of storage. The ILM system further may automatically determine or predict when storage capacities are running low and additional storage capacity is needed for any particular class of storage (or category of data) and may alert a user, such as a storage network administrator, of that condition or free up storage using optimization techniques.

Figure 1:
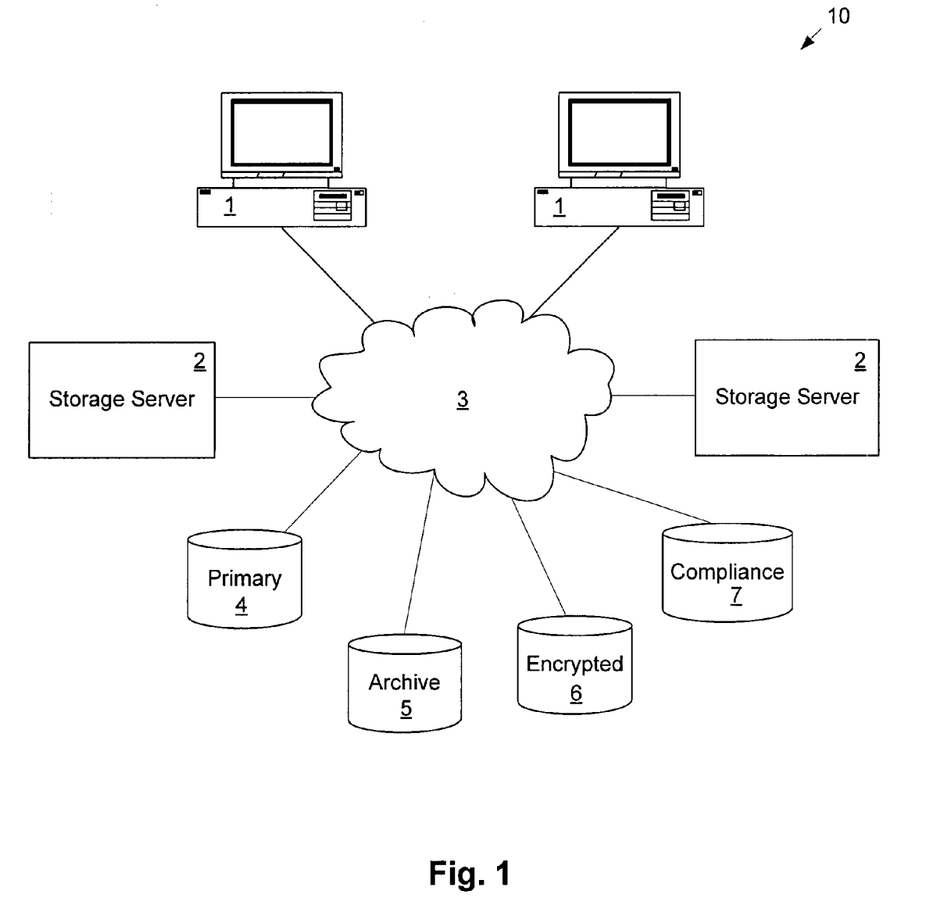
FIG. 1 illustrates a network storage system in which an automated ILM system can be used.

FIG. 1 conceptually illustrates a network storage system 10 in which the ILM system introduced here can be used. The network storage system 10 includes a set of storage clients 1 (hereinafter simply "clients") coupled to a network 3. The network 3 may be, for example, a local area network (LAN), a wide area network (WAN), a global area network (GAN) such as the Internet, a Fibre Channel fabric, or a combination of such networks. Each of the clients 1 may be, for example, a conventional personal computer, server-class computer, workstation, or the like.

The network storage system 10 also includes a set of storage servers 2 coupled to the network 3. Each of the storage servers 2 manages a separate mass storage facility, the details of which are not shown. Those mass storage facilities collectively provide separate storage areas for primary data 4, archived data 5, encrypted data 6, compliance data 7, and any other defined category or categories of data. For example, the system may allocate one or more dedicated volumes for primary data, another one or more dedicated volumes for archived data, etc. A given item of data may be moved or migrated from one storage area to another storage area one or more times during its lifecycle and may be deleted from all storage areas if no longer needed or if retention periods expire. Moving data in this context is the process of creating a copy of certain data at a new location and deleting the data from the old location. Migrating data in this context is the process of creating a copy of certain data at a new location, where that data in the new location is referenced only by a relatively small "stub" in the old location.

Each storage server 2 can receive and respond to various read and write requests from the clients 1, directed to data stored in (or to be stored in) its respective mass storage facility. The storage devices (not shown) in each mass storage facility may be, for example, conventional ranges of magnetic disks, optical disks such as CD-ROM or DVD based storage, magneto-optical (MO) storage, tape storage or any other type of non-volatile storage device suitable for storing large quantities of data. The storage devices in any of these mass storage facilities may be managed as one or more RAID groups or aggregates of devices.

The ILM system introduced here may be implemented within one or more of the storage servers 2 and/or within one or more other devices on the network 3. In particular, the ILM system may be implemented within an operating system and/or other software within one or more of the storage servers 2 and/or other devices on the network 3, as described further below. Further, the ILM system can be distributed amongst two or more separate devices which communicate with each other via a network.

Figure 2:
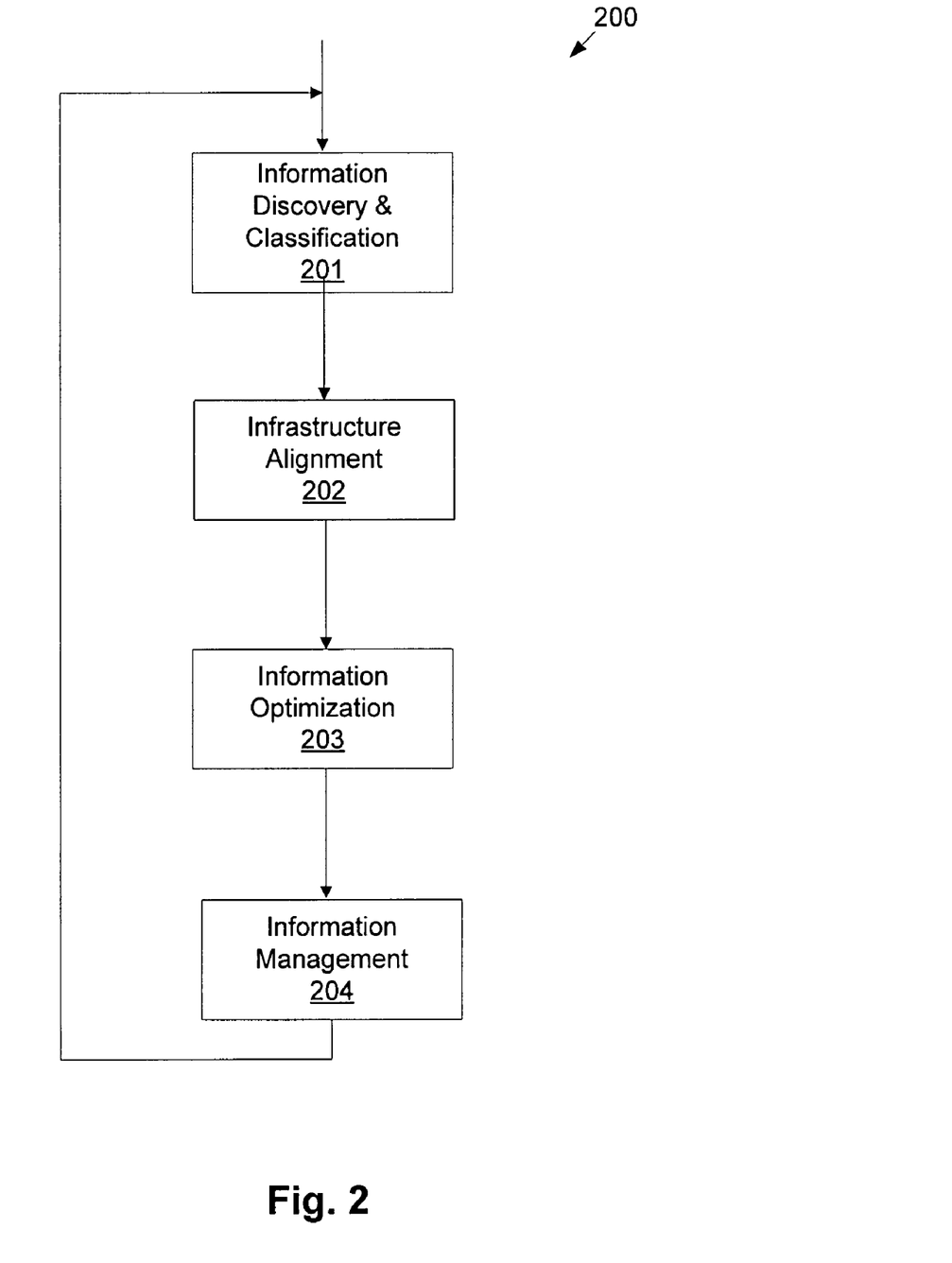
FIG. 2 illustrates an ILM process flow that may be implemented by the automated ILM system.

FIG. 2 illustrates an example of the overall process flow that may be implemented by the automated ILM system. As shown, the process 200 has four stages. Although these four stages are shown as a sequence, it should be recognized that any two or more of these process stages may execute at the same time on different items of information and/or devices in the network storage system, depending on the state of the information and its metadata and availability or storage resources. After initial system configuration, this process can execute repeatedly and continuously with no user input or intervention.

The first stage 201 is information discovery and classification. In this stage, the ILM searches (or "crawls") all of the data (i.e., content and associated metadata) stored in the network storage system 10, identifies the data and categorizes each item of data (e.g., each file) into a particular category based on metadata associated with the stored data and/or actual data content. This stage may be repeated periodically or from time to time, such as when data is added, deleted or modified. Further, a data item may be evaluated and categorized (or recategorized) any time it is read or modified.

The information categories may include, for example, primary data (e.g., important metadata, and data that has been recently created, modified or accessed), confidential data, archivable data, legal compliance data, data that can be de-duplicated, data that can be discarded, etc. Any of these categories can further be divided into subcategories to identify different types or levels of each category of information (e.g., there can be different levels of confidential information, such as "top secret", "secret", "business-sensitive", etc.). Different storage areas in the system can be allocated for each category or subcategory. In certain embodiments, the ILM system may categorize stored data by age, by file type, by size, by user, by path, by department, by classification, by properties, by content, etc.

The second stage 202 is infrastructure alignment. In this stage, the ILM system detects and allocates storage devices that have been recently added to the system 10, if any, determines each such device's class of storage, and allocates it for storing the category or categories of data, for which it is most suitable. The classes of storage may be defined in terms of, for example, device performance, device type, cost, availability, data security and/or integrity. Thus, for example, the ILM system will automatically recognize the difference between a high-performance Fibre Channel disk drive and a lower-performance tape or disk drive as well as "understand" its ability to secure and retain information and will recognize the role for which that device is best suited (the former in this example being more suitable for primary storage and the latter being more suitable for archive storage). Knowledge of the abilities and suitabilities of different types of devices can be programmed/configured into the ILM system before making it operational and can be updated by a user as needed (e.g., as new types of storage devices become available). This stage 202 may be triggered automatically in response to the addition of a new storage device to the network or some other specified event. Further, it may be repeated periodically or from time to time to confirm storage device inventory in the network storage system.

The third stage 203 is information optimization. In this stage, the ILM system optimizes data items according to the categories into which the data items have been classified. For example, compliance data may be moved from primary storage to a dedicated WORM storage facility; confidential data can be encrypted and then moved to a storage facility designated exclusively for confidential data; archivable data (e.g., older or infrequently-used data) can be sent to less-expensive storage, such as nearline disk or tape storage. This stage may be repeated periodically, or from time to time, or in response to a specified event.

The information optimization stage 203 may also involve other operations, such as deleting data, replicating data or de-duplicating data. De-duplicating data in this context is a technique of freeing up storage space by identifying multiple copies of a given data set and replacing one or more of those copies with just references to a copy that is retained. An example of a technique for de-duplicating data is described in U.S. patent application Ser. No. 11/414,600, filed on Apr. 28, 2006 and entitled, "System and Method for Sampling Based Elimination of Duplicate Data," of Ling Zheng et al., which is incorporated herein by reference.

Typically, only a single instance of the data is retained, and all deleted copies are replaced with references to that instance.

The fourth stage 204 is information management. In this stage, the ILM system determines or predicts when additional storage capacity is needed for any particular class of storage (or category of data) based on growth or seasonal patterns within the storage systems, and may alert a user such as a storage network administrator of that condition, and attempts to free up additional storage space automatically when needed. This stage may be repeated periodically, or from time to time, or in response to a specified event. An example of such an event is when, during the course of moving data in the third stage 203, the ILM system determines that not enough free capacity exists in the target class of storage device to accommodate the data to be moved, the ILM system will pro-actively try to prevent an out-of-storage condition. As another example, an alert may be provided to the user whenever a predetermined threshold percentage of storage capacity is exceeded in a particular class of storage device in the system. In certain embodiments, the ILM system predicts when additional storage of a particular type will be needed based upon the rate at which the storage facility for that type is being filled up.

Figure 3:
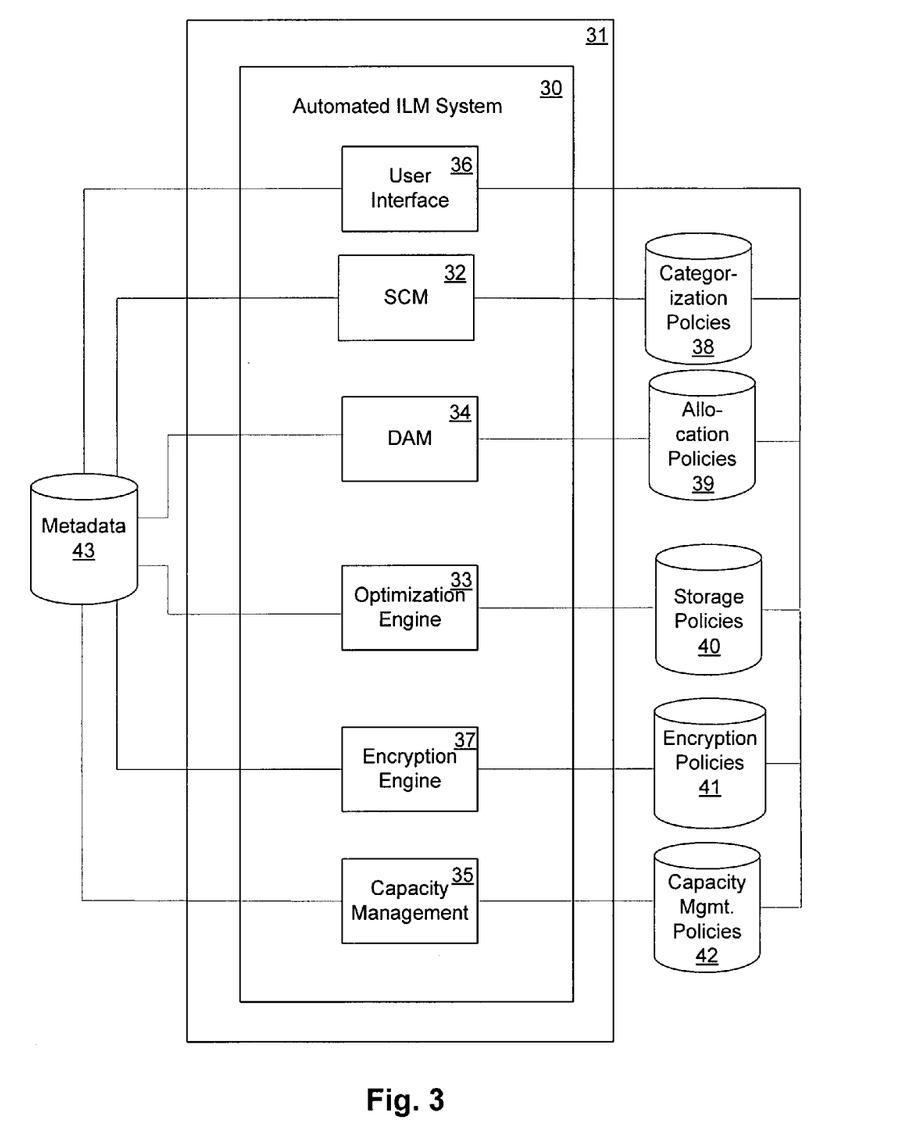
FIG. 3 illustrates the elements of the automated ILM system according to an embodiment of the invention.

FIG. 3 illustrates the elements of the automated ILM system according to an embodiment of the invention. The automated ILM system 30 is implemented within a processing system 31 connected to the network 3 (or within multiple processing systems as noted above). The processing system 31 may be one or more of the storage servers 2. In the illustrated embodiment, the ILM system 30 includes a search and classification module (SCM) 32, an optimization engine 33, a discovery and allocation module (DAM) 34, a capacity management module 35, a user interface module 36 and an encryption engine 37.

Figure 4:
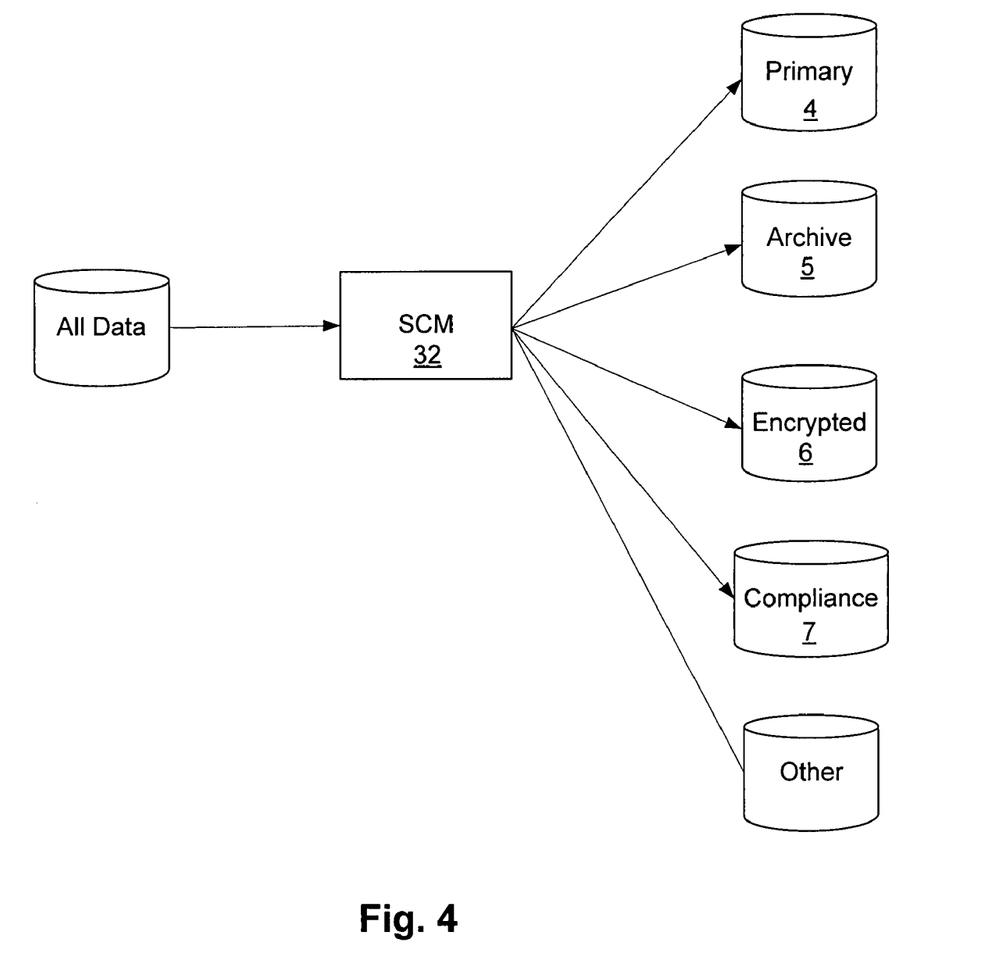
FIG. 4 illustrates a search and categorization module (SCM) classifying data into a plurality of categories.

The SCM 32 is responsible for executing the operations of the first stage (201) of the ILM process, as described above, i.e., identifying and categorizing all of the data stored in the network storage system into various categories, as shown in FIG. 4. It does so by applying data categorization policies stored in a database 38. The SCM 32 may, for example, examine file attributes and/or file contents to categorize files. The database 38 and the data to be categorized may be local or remote with respect to the SCM 32.

In general, the data categorization policies are intended to address at least some of the following questions:

1) Who owns the data?

2) Is the data needed?
3) Can the data be archived?
4) Can the data be deleted?
5) Is the data controlled?
6) To whom is the data important?
7) What process can be applied?
8) What level of services required?
9) What risks are associated with this data?
10) Where is the data in its lifecycle?

Some simple examples of data categorization policies include:

1) Any file which contains a social security number shall be categorized as "confidential";
2) Any file which contains a credit card number shall be categorized as "confidential";
3) Any file which has not been accessed within the last 30 days shall be categorized as "archivable";
4) All data audit logs shall be categorized as "compliance data";
5) Any file which contains any of the following terms shall be categorized as "HIPAA data": Patient name, Patient information, Patient ID, Hospital information, Procedure, Surgery, Surgical procedure, Health plan information;
6) Any file which contains any of the following terms shall be categorized as "Intellectual Property" data": Patent, Invention, Trademark, Trade secret, Innovation, Copyright.

Of course, many other data categorization policies are conceivable.

In one embodiment, the SCM 32 is implemented as a separate, self-contained device on the network. Various information classification and management (ICM) products are available today, which can be used for this purpose. These products work at the file system attribute level and are designed to open files and extract their content to allow complex searches, reporting, lifecycle management, and legal retention based on policies. An example of such a product is the Information Server 1200 from NetApp.

The optimization engine 33 is responsible for executing the operations of the third stage (203) of the ILM process, as described above, i.e., migrating or moving data to the most appropriate data storage facility in the network storage system, deleting data, replicating data, and de-duplicating data, in each case according to the category into which the data was classified. It does so based on data storage policies stored in a database 39 and metadata 43 relating to the data to be optimized and/or the actual data to be optimized. The optimization engine 33 may also create metadata 43 as part of the optimization process; for example the optimization engine 33 may tag certain data as "mM" or the like or perform high-speed electronic shredding. The databases 39 and 33 and the data to be optimized may be local or remote with respect to the optimization engine 33.

Some simple examples of data storage policies include:

1) All "confidential" data shall be sent to encrypted storage;
2) All "compliance" data shall be sent to WORM storage;
3) All "archivable" data shall be sent to nearline storage;
4) All "intellectual property" data shall be sent to encrypted storage; and
5) All expired data shall be deleted.

Numerous other data storage policies are conceivable.

The encryption engine 37 is responsible for encrypting data categorized as "confidential", "sensitive", "non-public information" or the like, and for decrypting the encrypted data in response to authorized data access requests. The encryption engine 37 does so based upon encryption policies stored in a database 41. Encryption is normally performed for a data item just prior to migrating the data item to dedicated encrypted storage. Some simple examples of encryption policies include:

1) For any data categorized as "highly confidential", enable secure logging (crypto-signed logs to enable tamper-proof audit trail of administrative access and user activity); and
2) When deleting any encrypted data, delete all encryption keys associated therewith.

Numerous other data encryption policies are conceivable.

The DAM 34 is responsible for executing the operations of the second stage (202) of the ILM process, as described above, i.e., detecting, classifying and allocating storage devices that are present in the network storage system and allocating each of them for storage of the appropriate category or categories of data. It does so based on storage allocation policies stored in a database 40. The database 40 may be local or remote with respect to the DAM 34.

Some simple examples of data storage policies include:

1) All Fibre Channel disk drives shall be allocated for active databases and indices;
2) All nearline storage devices shall be allocated for archive (secondary) data storage;
3) All 'WORM'ed storage devices shall be allocated to compliance data; and
4) Some WORM archive storage shall be allocated for structured, unstructured and semi-structured data.

Numerous other data storage policies are conceivable.

The capacity management module 35 is responsible for executing the operations of the fourth stage (204) of the ILM process, as described above, i.e., determining or predicting when additional storage capacity is needed for any particular class of storage (or category of data) and alerting a user of that condition when appropriate and for providing pro-active forecasting of future needs based on storage consumption. The capacity management module 35 does so based upon capacity management policies stored in a database 42. Some simple examples of capacity management policies include:

1) If free storage in any pool drops below 20%, then initiate process of ordering additional storage devices from supplier;
2) If storage utilization is forecasted to be at 80% at a specific calendar date, then plan storage ordering process;
3) If storage utilization reaches 70%, then initiate data clean-up operations to free up storage.

Numerous other capacity management policies are conceivable.

The user interface module 36 generates a user interface, such as a command line interface (CLI) and/or a graphical user interface (GUI), to allow a user (e.g., a network administrator) to configure and control the ILM system 30. These activities include creating and modifying the policies stored in the policies databases 38-42, setting the triggering events or time periods for each phase of the process, etc. The user interface generated by user interface module 36 may be displayed to the user locally on the processing system 31 which includes the ILM system 30 or on some other processing system which may be remote with respect to processing system 31.

Figure 5:
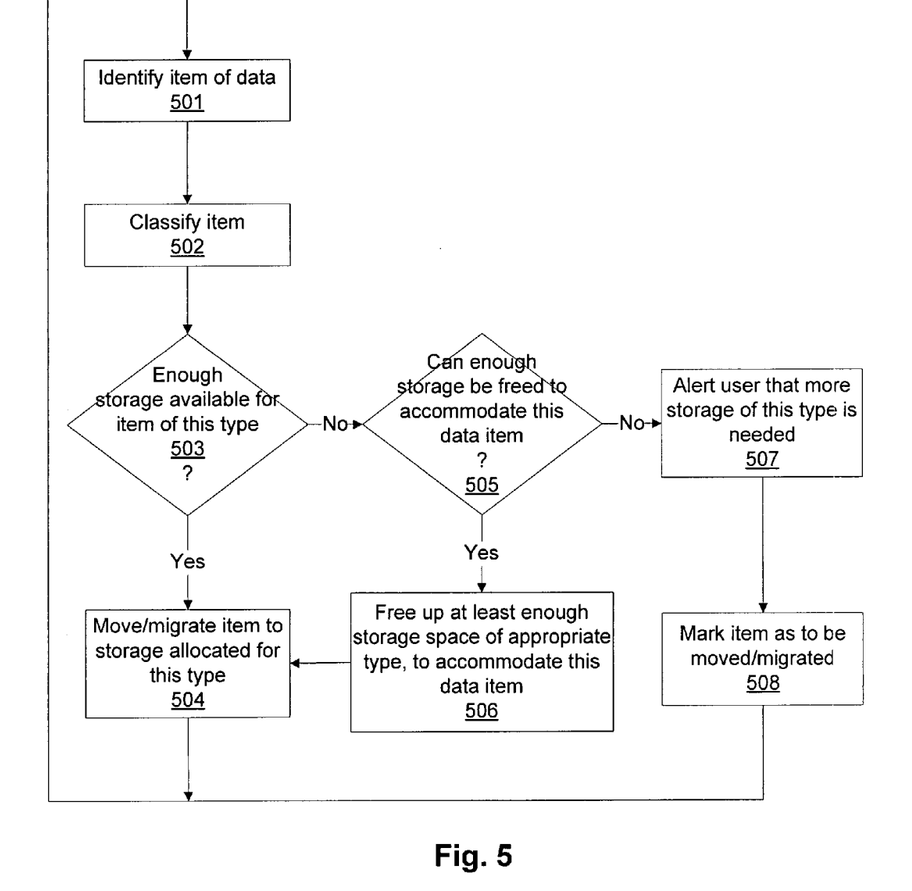
FIG. 5 illustrates an example of how a particular item of data may be handled by the ILM system.

FIG. 5 illustrates an example of a process by which a particular item of data, such as a file, can be processed by the ILM system 30. At 501, the ILM system 30 identifies the item of data during its search operation. At 502, the SCM 32 classifies the item of data. The capacity management module 35 then determines whether there is enough storage space available to store this data item at 503. If enough space is available, then at 504 the optimization engine 33 moves or migrates the data item (whichever is appropriate, according to the applicable policy) to one or more storage devices allocated for this category of data. The process then loops back to the beginning (501) and repeats on different data.

If not enough storage space is available for this data item, then the process proceeds to 505, at which the capacity management module 35 determines whether sufficient storage space can be freed to accommodate the data. Storage space may be freed by, for example, deleting old or expired data, de-duplicating data, or defragmenting data. If sufficient storage space can be freed to accommodate the data, then at 506 the capacity management module 35 frees up at least enough storage space to accommodate the data, and the process then continues to 504 as described above, i.e., by the optimization engine 33 moving or migrating the data to the appropriate location. The process then loops back to the beginning (501) and repeats on different data.

If sufficient storage space cannot be freed to accommodate the data (505), then the process instead proceeds from 505 to 507, where the capacity management module 35 alerts a user (e.g., storage network administrator) that more storage space is needed for this category of data. Then at 508 the optimization engine 33 marks this data item as "to be moved/migrated", i.e., to be moved or migrated when sufficient storage space becomes available. When sufficient storage space becomes available for this data item, it will be automatically moved or migrated by the optimization engine 33 to the appropriate storage location. The process then loops back to the beginning (501) and repeats on different data.

Figure 6:
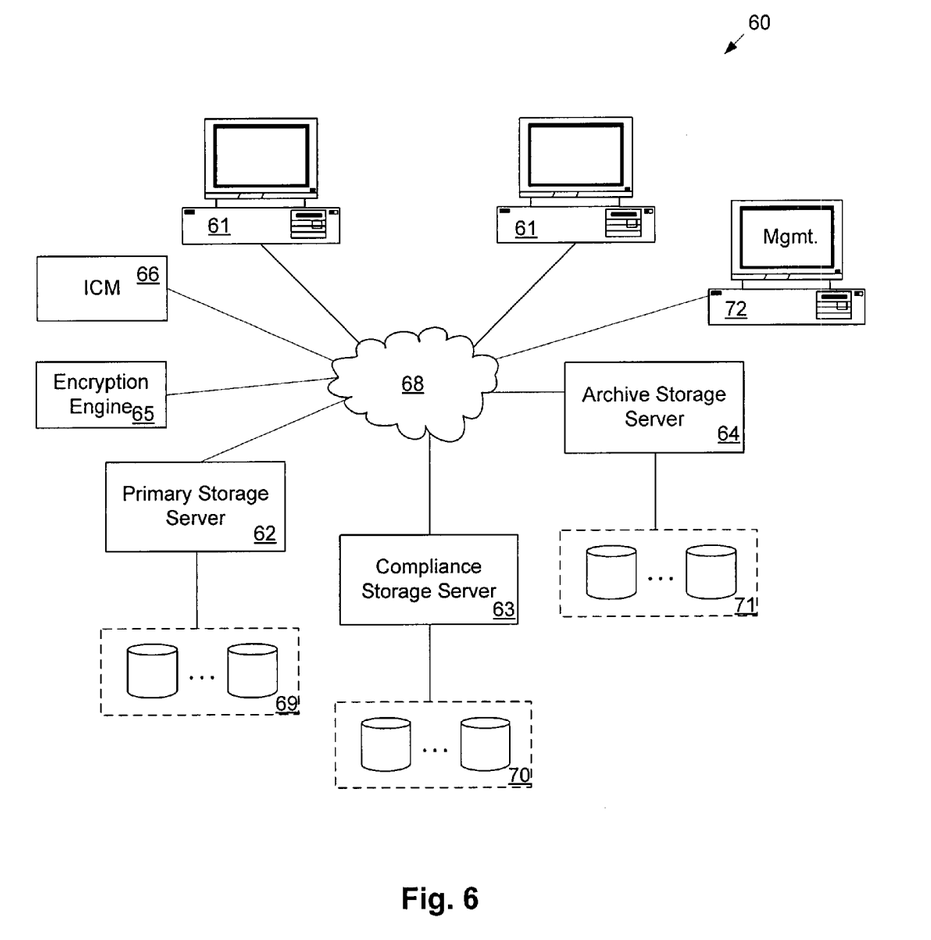
FIG. 6 shows a particular implementation of a network storage system that can include an embodiment of the automated ILM system.

FIG. 6 shows a particular implementation of a network storage system that can include an embodiment of the automated ILM system 30 described above. In this implementation, the functions of the ILM system 30 are distributed among multiple separate devices, as described further below. As shown, the system 60 includes a set of clients 61, a primary storage server 62, a compliance storage server 63, an archive storage server 64, an encryption engine 65, an ICM device 66, and a management console 67, all coupled to a network 68. The network 68 may be, for example, a local area network (LAN), a wide area network (WAN), a global area network (GAN) such as the Internet, a Fibre Channel fabric, or a combination of such networks.

The primary storage server 62 is responsible for storing and managing primary data in the system. Accordingly, coupled to the primary storage server 62 is a set of high-performance mass storage devices 69, such as Fibre Channel disks. The primary storage server 62 can be, for example, a storage server such as one of the various Filer products from NetApp.

The compliance storage server 63 manages a separate set of mass storage devices 70 and is responsible for storing and managing compliance data (e.g., WORM storage). Accordingly, the compliance storage server 63 may include application layer software designed for storing data in WORM state. WORM state is defined as a non-deletable, non-modifiable state. The primary storage server 63 also can be, for example, a storage server such as one of the various Filer products from NetApp. The compliance storage server 63 may include compliance application software, such as SnapLock software from NetApp, which allows data files or volumes to be designated as WORM data, using the file system interface of the Data ONTAP® operating system in NetApp Filers and NearStore devices. SnapLock provides the capability to ensure that when data is committed to WORM state, it cannot be altered or deleted for a specified retention period.

The archive storage server 64 is responsible for storing and managing archive data and has its own set of mass storage devices 71. It provides slower but less expensive storage than the primary storage server 62. The archive storage server 64 can be a nearline device, such as one of the NearStore® products available from NetApp.

The encryption engine 65 encrypts and decrypts data classified as "confidential", "sensitive", or the like. An example of a device which may be employed for this purpose is the Decru DataFort® E Series product available from NetApp. The encryption engine 65 is normally invoked by the ICM device 66 but can also be invoked by the primary storage server 62, the compliance storage server 63 or the nearline storage server 64. The network storage system further includes an authentication and authorization subsystem (not shown) to determine which users are authorized to access encrypted data.

Also connected to the network 68 is a management system 72, which is a computer system used by a user, such as a network administrator, to configure and control operation of the network storage system, including the automated ILM system. This may be accomplished by using features of a user interface generated by the user interface module 36 of the ILM system 30 or a separate management application on the management system 72.

The ICM device 66 implements the functionality of the SCM 32 described above. The encryption engine 65 implements functionality of the encryption engine 37 described above. The WORM/compliance functionality can be implemented at least partially by the compliance storage server 63. The primary storage server 62 also may implement some of the WORM/compliance functionality; for example, to the extent the primary storage server 62 may initially store data which is later categorized as compliance data, the primary storage server 62 has the functionality to transfer that data to the compliance storage server 63. Other functionality of the ILM system 30, such as storage device discovery and classification, data movement/migration and capacity management, may be implemented within any one or more of: the primary storage server 62, the compliance storage server 63, the archive storage server 64 or the management console 72.

Figure 7:
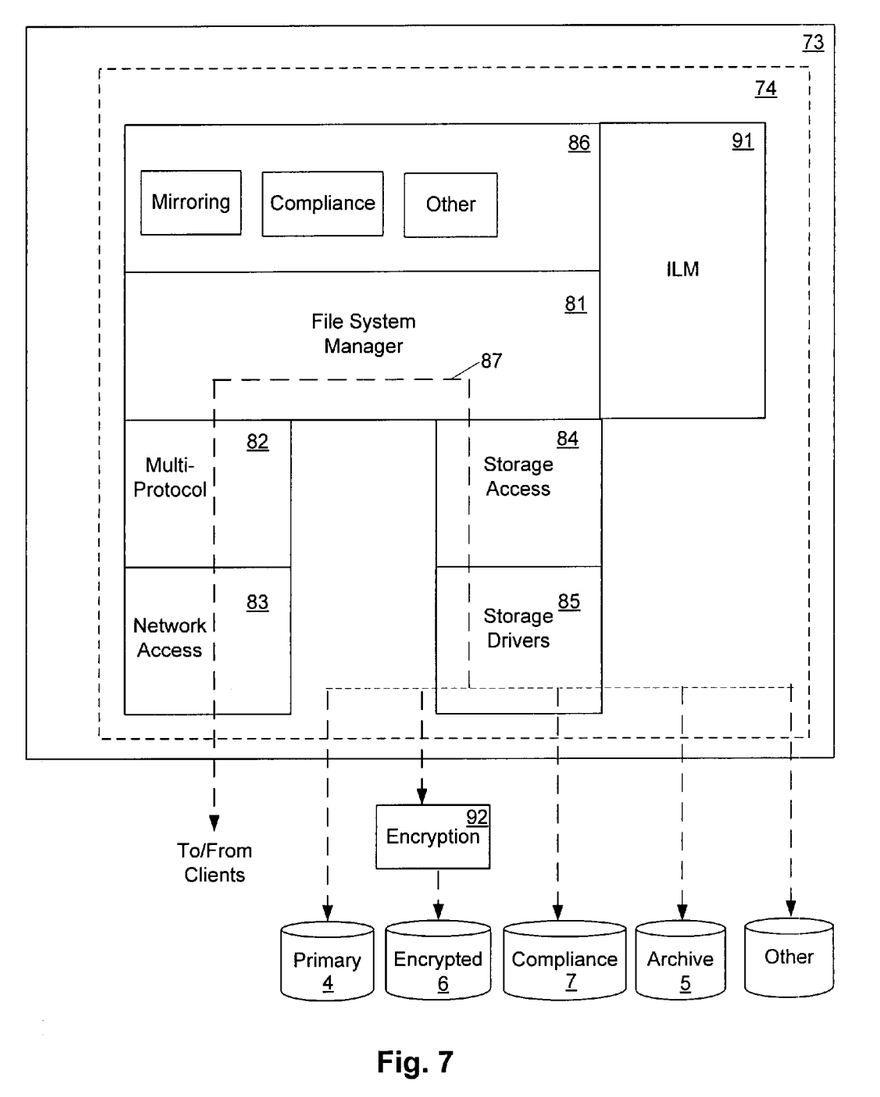
FIG. 7 illustrates an example of the architecture of software within a storage server that can implement some or all of the functionality of the automated ILM system.

FIG. 7 illustrates an example of the architecture of software within a storage server 73 that can implement some or all of the above-described functionality of the automated ILM system 30. Note that the constituent elements of the software 24 could alternatively be implemented in the form of firmware, or as special-purpose hardware, such as one or more application specific integrated circuits (ASICs), programmable logic devices (PLDs) or the like, or as a combination of hardware, software and/or firmware.

As shown, the software 74 of the storage server 73 includes several modules, or "layers". These layers include a file system manager 81. The file system manager 81 is, in certain embodiments, software that manages one or more file systems or other structured sets of data managed by the storage server 73. In particular, the file system manager 81 imposes a hierarchy (e.g., a directory/file structure) on the stored data and manages client-initiated read and write operations at a high level (while delegating certain functions to lower-level layers).

To allow the storage server 73 to communicate over a network (e.g., with clients), the software 74 also includes a network access layer 83, and a multi-protocol layer 82 operatively coupled between the file system manager 81 and the network access layer 83. The multi-protocol layer 82 implements a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 83 includes one or more drivers which implement one or more lower-level protocols to communicate over the network, such as Ethernet or Fibre Channel.

To enable the storage server 73 to communicate with its mass storage subsystem, the software 74 further includes a storage driver layer 85, and a storage access layer 84 operatively coupled between the file system manager 81 and the storage driver layer 85. The storage access layer 84 implements a higher-level disk storage protocol, such as RAID-4, RAID-5 or RAID-DP. The storage access layer 84 is alternatively called the "RAID layer". The storage driver layer 85 implements a lower-level storage device access protocol, such as Fibre Channel Protocol (FCP) or SCSI.

Also shown in FIG. 7 is the path 87 of data flow, through the software 74, associated with a client-initiated read or write request.

The software 74 also includes an application layer 86 logically on top of the file system manager 81. The application layer 86 may include a data mirroring application 88 such as SnapMirror software from NetApp, a data compliance application 89 such as SnapLock software from NetApp, and/or other applications 90 related to managing or processing data.

The software 74 further includes an ILM layer 91 operatively coupled to the application layer 86 and the file system manager 81. The ILM layer 91 implements the above described functionality of the automated ILM system 30, including data search and categorization, data migration, storage classification and allocation, capacity management, etc. The ILM layer 91 also invokes the mirroring application 88 and the compliance application 89 when appropriate. The ILM layer 91 may also include an application program interface (API) or other form of interface to enable it to invoke an external application (i.e., an application outside the storage server), such as the encryption engine 92. In other embodiments, the encryption engine 92 may be implemented within the storage server, such as in the form of an encryption application within the application layer 86. For archivable data, the ILM layer 91 can cause the storage server to store the archivable data in local archive storage or to transmit the archivable data to a separate archive storage subsystem (e.g., a nearline device).

Figure 8:
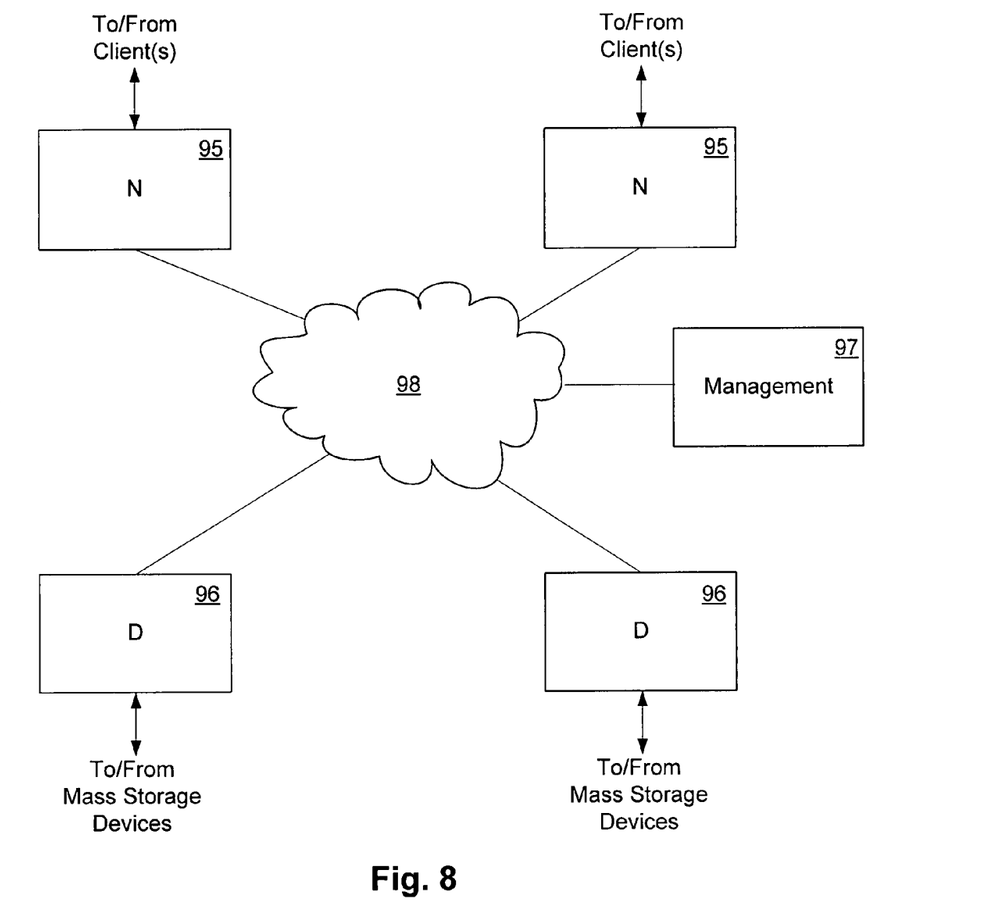
FIG. 8 illustrates a distributed architecture of a storage system including multiple network ("N-") blades and multiple data ("D-") blades.

In some embodiments, a storage server may have a distributed architecture, such that it is implemented in two or more physically separate devices. For example, as shown in FIG. 8, a network storage system may include two or more separate network modules ("N-modules") 95, two or more separate data modules ("D-modules") 96, and a management module 97, where each combination of an N-module 95 and a D-module 96 essentially forms a separate storage server. In such an embodiment, each N-module 95 is used to communicate with a designated set of one or more storage clients. Each D-module 96 includes the file system functionality and is used to communicate with a specific storage subsystem. Each N-module 95 can communicate with any D-module 96, through a switching fabric or network 98. The communication between N-modules 95 and D-modules 96 is coordinated by the management module 97. In a distributed embodiment such as this, the ILM layer 91 would normally be implemented in the management module 97 and/or in one or more of the D-modules 95.

Figure 9:
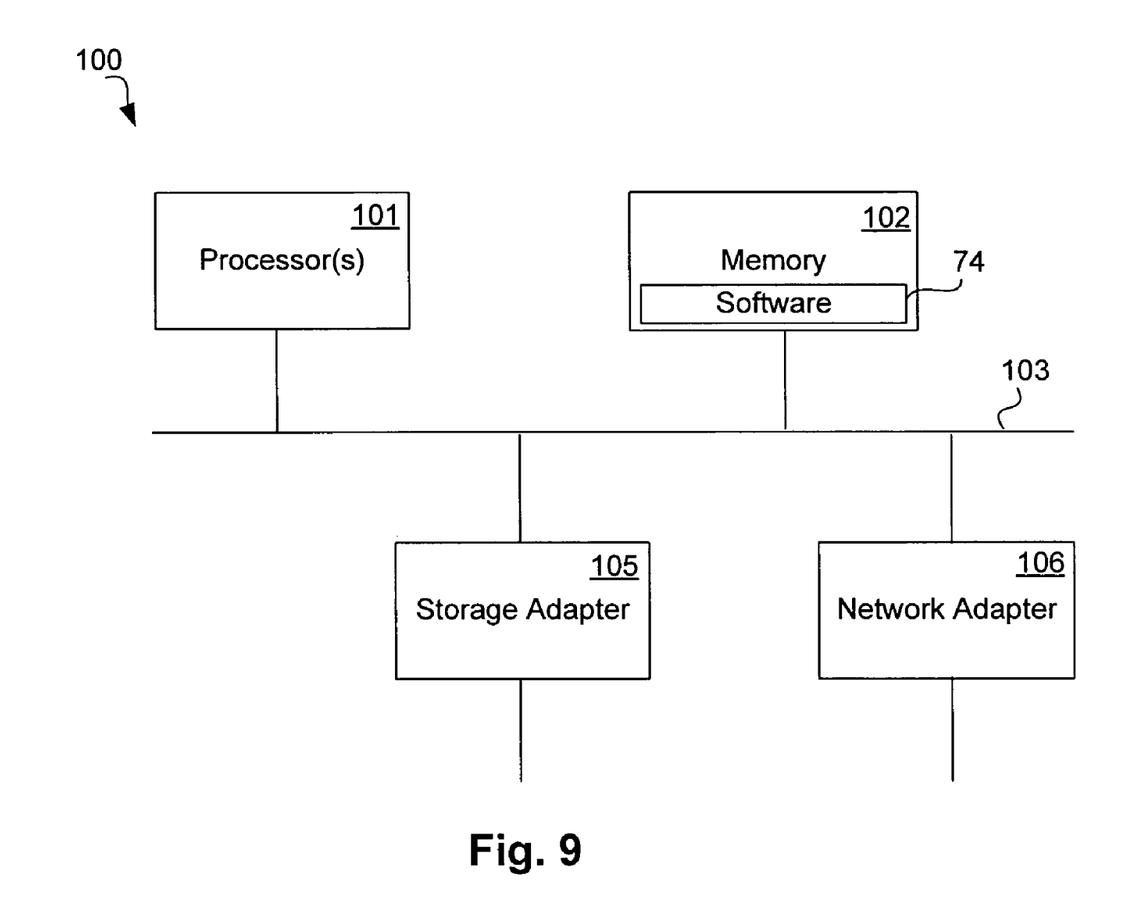
FIG. 9 is a high-level block diagram showing an example of the hardware architecture of a storage server that can implement some of all of the functionality of the automated ILM system.

FIG. 9 is a high-level block diagram showing an example of the hardware architecture of a storage server 100 that can implement some of all of the above-described functionality of software 24 and automated ILM system 30. Certain standard and well-known components which are not germane to the present invention are not shown. The storage server 100 includes one or more processors 101 and memory 102 coupled to a bus system 103. The memory 102 may include one or more physical devices including any one or more of read-only memory (ROM), random access memory (RAM), flash memory, etc. The bus system 103 shown in FIG. 9 is an abstraction that represents any one or more separate physical buses and/or point-to-point connections, connected by appropriate bridges, adapters and/or controllers. The bus system 103, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 101 form the CPU of the storage server 100 and, thus, control its overall operation. In certain embodiments, the processors 101 accomplish this by executing software stored in memory 102, including software 74 described above. Each processor 101 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Also connected to the processors 101 through the bus system 103 are a storage adapter 105 and a network adapter 106. The storage adapter 105 allows the storage server 100 to access its mass storage subsystem and may be, for example, a Fibre Channel adapter or a SCSI adapter. The network adapter 106 provides the storage server 100 with the ability to communicate with remote devices, such as storage clients, over a network and may be, for example, an Ethernet adapter, a Fibre Channel adapter, or the like.

Thus, a method and apparatus for automated ILM have been described.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
automatically searching a network storage system to identify a plurality of data items stored in the network storage system, the network storage system including a plurality of data storage facilities of different types coupled to a network;
automatically classifying each of the data items into a category of a plurality of data categories, said automatically classifying each of the data items comprising automatically classifying a first data item;
automatically optimizing each of the data items to a particular data storage facility of the plurality of data storage facilities, according to the category into which the data item was classified, said automatically optimizing each of the data items to a particular data storage facility comprising automatically migrating the first data item to a first data storage facility of the plurality of data storage facilities based on a classification of the first data item;
automatically, by a computer, reclassifying the first data item after the first data item has been migrated to the first data storage facility; and
after automatically reclassifying the first data item, automatically performing one of moving, migrating and deleting the first data item based on a new classification of the first data item.

2. A method as recited in claim 1, wherein the plurality of data storage facilities include a plurality of different storage classes.

3. A method as recited in claim 2, wherein automatically optimizing each of the data items to a particular data storage facility comprises:
moving a first data item from a first storage facility to a second storage facility;
migrating a second data item from the first storage facility to a third storage facility;
deleting a third data item; and
de-duplicating a fourth data item.

4. A method as recited in claim 2, further comprising:
automatically detecting a storage device connected to the network;
automatically determining a storage class of the storage device; and
automatically associating the storage device with a data category of said plurality of data categories, based on the storage class of the storage device.

5. A method as recited in claim 2, further comprising:
automatically detecting that an amount of used storage space in one of said storage classes meets a specified criterion; and
in response to detecting that the amount of used storage space in said one of said storage classes meets the specified criterion, causing an alert to issue to indicate to a user that additional storage space is needed for said one of said storage classes.

6. A method as recited in claim 2, further comprising:
automatically detecting that an amount of used storage space in one of said storage classes exceeds the specified capacity usage criterion; and
in response to automatically detecting that the amount of used storage space in said one of said storage classes exceeds the specified capacity usage criterion, automatically freeing additional storage space in said one of said storage classes.

7. A method as recited in claim 1, wherein the plurality of data categories include: primary data, confidential data, archivable data, and compliance data.

8. A method as recited in claim 1, wherein the plurality of data storage facilities include:
a primary storage facility; and
an archive storage facility which has an access latency greater than an access latency of the primary storage facility.

9. A method as recited in claim 8, further comprising an encryption engine, wherein the plurality of data storage facilities further include a storage facility to store encrypted data encrypted by the encryption engine.

10. A method as recited in claim 9, wherein the plurality of data storage facilities further include a storage facility to store write-once/read-many (WORM) data.

11. A method comprising:
automatically identifying a plurality of data items stored in a network storage system, the plurality of data items including a plurality of files, the network storage system including a plurality of data storage facilities of different classes coupled to a network;
automatically classifying each of the data items into a category of a plurality of data categories;
automatically, by a computer, optimizing each of the data items to a particular data storage facility of the plurality of data storage facilities, according to the category into which the data item was classified, wherein said automatically optimizing comprises:
moving a first data item from a first storage facility to a second storage facility based on a classification of the first data item,
migrating a second data item from the first storage facility to a third storage facility based on a classification of the second data item,
deleting a third data item based on a classification of the third data item,
replicating a fourth data item based on a classification of the fourth data item, and
de-duplicating a fifth data item;
automatically detecting a storage device connected to the network storage system;
automatically determining a storage class of the storage device;
automatically assigning the storage device to a data category of said plurality of data categories, based on the storage class of the storage device;
automatically detecting that an amount of used storage space in one of said storage classes meets a specified criterion; and
in response to detecting that the amount of used storage space in said one of said storage classes meets the specified criterion, performing at least one of:
causing an alert to issue to indicate to a user that additional storage space is needed for said one of said storage classes; and
automatically freeing additional storage space in said one of said storage classes.

12. A method as recited in claim 11, wherein:
said automatically classifying each of the data items comprises automatically classifying a first data item;
said automatically optimizing each of the data items to a particular data storage facility comprises automatically moving or migrating the first data item to a first data storage facility of the plurality of data storage facilities based on a classification of the first data item; and
wherein the method further comprises:
reclassifying the first data item after the first data item has been moved or migrated to the first data storage facility; and after the first data item has been reclassified, automatically moving, migrating or deleting the first data item based on a new classification of the first data item.

13. A method as recited in claim 11, wherein the plurality of data categories include: primary data, confidential data, old data, and compliance data.

14. A method as recited in claim 11, wherein the plurality of storage classes include:
 primary storage;
 archive storage which has an access latency greater than an access latency of the primary storage;
 encrypted data storage; and
 write-once/read-many (WORM) storage.

15. An automated information lifetime management (ILM) system for use in a network storage system, the ILM system comprising:
 a search and classification module to search the network storage system to identify a plurality of data items stored in the network storage system and to automatically classify each of the data items into a category of a plurality of data categories, the network storage system including a plurality of data storage facilities of different classes, wherein the automatically classifying each of the data items includes automatically classifying a first data item;
 an optimization engine to automatically optimize each of the data items to a particular data storage facility of the plurality of data storage facilities, according to the category into which the data item was classified, wherein automatically optimizing each of the data items includes automatically migrating the first data item to a first data storage facility of the plurality of data storage facilities based on a classification of the first data item;
 a reclassification module executing on a processor to reclassify the first data item after the first data item has been migrated to the first data storage facility; and
 a movement module to automatically perform one of moving, migrating, and deleting the first data item based on a new classification of the first data item, wherein the one of moving, migrating and deleting the first data item occurs after the first data item is reclassified.

16. An automated ILM system as recited in claim 15, wherein the optimization engine is configured to optimize data by moving data, migrating data, deleting data, and de-duplicating data, according to specified policies.

17. An automated ILM system as recited in claim 16, further comprising a discovery and allocation module to:
 detect a storage device connected to the network storage system;
 determine a storage class to which the storage device belongs; and
 associate the storage device with a data category of said plurality of data categories, based on the storage class to which the storage device belongs.

18. An automated ILM system as recited in claim 16, further comprising a capacity management module to:
 detect that an amount of used storage space in one of said storage classes meets a specified capacity criterion; and
 in response to detecting that the amount of used storage space in said one of said storage classes meets the specified capacity criterion, cause an alert to issue to indicate to a user that additional storage space is needed for said one of said storage classes.

19. An automated ILM system as recited in claim 16, further comprising a capacity management module to:
 detect that an amount of used storage space in one of said storage classes meets a specified capacity criterion; and
 in response to detecting that the amount of used storage space in said one of said storage classes meets the specified capacity criterion, free additional storage space in said one of said storage classes.

20. An automated ILM system as recited in claim 15, wherein the plurality of data categories include: primary data, confidential data, old data, and compliance data.

21. An automated ILM system as recited in claim 15, further comprising an encryption engine to encrypt data classified as confidential by the search and classification module.

22. An automated ILM system as recited in claim 15, wherein the plurality of data storage facilities include:
 a primary storage facility; and
 an archive storage facility which has an access latency greater than an access latency of the primary storage facility.

23. An automated ILM system as recited in claim 22, wherein the plurality of data storage facilities further include a storage facility to store encrypted data.

24. An automated ILM system as recited in claim 22, wherein the plurality of data storage facilities further include a storage facility to store write-once/read-many (WORM) data.

25. A storage server to operate in a network storage system, the storage server comprising:
 a storage interface through which to access a mass storage subsystem including plurality of non-volatile mass storage devices;
 a network interface through which to communicate with a plurality of storage clients over a network;
 a storage manager to process data access requests received from the storage clients directed to data stored in the mass storage subsystem; and
 an ILM subsystem including:
  logic to search the network storage system to identify a plurality of data items stored in the network storage system, the network storage system including a plurality of data storage facilities of different types;
  logic to classify each of the data items into a category of a plurality of data categories, the classifying including classifying a first data item;
  logic to optimize each of the data items to a particular data storage facility of the plurality of data storage facilities, according to the category into which the data item was classified, the optimizing including migrating the first data item to a first data storage facility based on a classification of the first data item;
  logic to reclassify the first data item after the first data item is migrated to the first data storage facility; and
  logic to perform one of migrating, moving and deleting the first data item based on a new classification of the first data item.

26. A storage server as recited in claim 25, wherein the plurality of data storage facilities include a plurality of different storage classes.

27. A storage server as recited in claim 25, wherein the logic to optimize comprises logic to move data, logic to migrate data, logic to delete data, and logic to de-duplicate data, according to specified policies.

28. A storage server as recited in claim 25, wherein the ILM subsystem further includes:
 logic to detect a storage device connected to the network;
 logic to determine a storage class of the storage device; and
 logic to associate the storage device with a data category of said plurality of data categories, based on the storage class of the storage device.

29. A storage server as recited in claim 25, wherein the ILM subsystem further includes:
    logic to detect that an amount of used storage space in one of said storage classes meets a specified criterion; and
    logic to cause an alert to issue to indicate to a user that additional storage space is needed for said one of said storage classes, in response to detecting that the amount of used storage space in said one of said storage classes meets the specified criterion.

30. A storage server as recited in claim 25, wherein the ILM subsystem further includes:
    logic to detect that an amount of used storage space in one of said storage classes meets a specified criterion; and
    logic to free additional storage space in said one of said storage classes in response to detecting that an amount of used storage space in one of said storage classes meets a specified capacity usage criterion.

31. A storage server as recited in claim 25, wherein the plurality of data categories include: primary data, confidential data, old data, and compliance data.

32. A storage server as recited in claim 25, further comprising logic to encrypt data classified as confidential by the ILM module.

33. A storage server as recited in claim 25, wherein the plurality of data storage facilities include:
    a primary storage facility; and
    an archive storage facility which has an access latency greater than an access latency of the primary storage.

34. A storage server as recited in claim 33, wherein the plurality of data storage facilities further include a storage facility to store encrypted data;

35. A storage server as recited in claim 34, wherein the plurality of data storage facilities further include a storage facility to store write-once/read-many (WORM) data.

36. A system comprising:
    a processor coupled to a memory through a bus; and
    executable instructions stored in the memory which when executed by the processor cause the processor to automatically:
        search a network storage system to identify a first data item stored in the network storage system;
        classify the first data item into a first category, the classifying based on one of contents of the first data item and an access history of the first data item;
        migrate the first data item to a first data storage facility based on a classification of the first data item into the first category;
        reclassify the first data item into a second category after migrating the first data item to the first data storage facility, the reclassifying based on one of the contents of the first data item and the access history of the first data item; and
        migrate the first data item based on the reclassification of the first data item into the second category.

* * * * *